United States Patent [19]

Arsenault

[11] Patent Number: 5,788,199

[45] Date of Patent: Aug. 4, 1998

[54] EYEGLASS HOLDER MOUNTED ON A REARVIEW MIRROR

[76] Inventor: B. James Arsenault, RR 2 Ponty Pool, Ontario, Canada, L0A 1K0

[21] Appl. No.: 783,336

[22] Filed: Jan. 16, 1997

[51] Int. Cl.[6] .................................................. A47B 96/06
[52] U.S. Cl. .......................... 248/231.81; 248/309.1; 248/902
[58] Field of Search .......................... 248/231.81, 902, 248/309.1, 316.7, 210, 211, 228.7, 300, 214; D3/266; D6/300, 313; 211/85.1, 86.01

[56] References Cited

U.S. PATENT DOCUMENTS

| | | | |
|---|---|---|---|
| D. 25,758 | 7/1896 | Bergner | D6/313 |
| D. 31,165 | 7/1899 | Stiles et al. | D6/300 |
| D. 372,939 | 8/1996 | Callas | 248/295.1 |
| D. 389,526 | 1/1998 | Callas | D20/43 |
| 2,438,085 | 3/1948 | Woodings et al. | 248/228.7 |
| 2,693,226 | 11/1954 | Schweighart | 248/231.81 |
| 2,747,825 | 5/1956 | Lachenmayer | 248/210 |
| 3,662,982 | 5/1972 | Antonius | 248/309 |
| 4,239,167 | 12/1980 | Lane | 248/205 A |
| 4,667,913 | 5/1987 | Peelle et al. | 248/228 |
| 5,000,410 | 3/1991 | Beavers | 248/205.3 |
| 5,011,101 | 4/1991 | Buchser | 248/27.3 |
| 5,046,696 | 9/1991 | Lee | 248/301.9 |
| 5,490,651 | 2/1996 | Kump | 248/222.12 |

*Primary Examiner*—Leslie A. Braun
*Assistant Examiner*—Robert Lipcsik

[57] ABSTRACT

A new Eyeglass Holder Mounted On A Rearview Mirror for providing a safe and convenient place for the storage of eyeglasses within a vehicle thereby preventing the eyeglasses from becoming scratched or broken. The inventive device includes a resilient syncline member, an upper arm secured to the syncline member, a lower arm secured to the syncline member opposite of the upper arm forming an M-shape, an upper clasp secured to the upper arm and a lower clasp secured to the lower arm. A loop is secured to the lower clasp opposite of the lower arm for receiving a temple arm from the eyeglasses. The resilient syncline member has a pointed end which engages a rear surface of a review mirror. A cylindrical support member is secured to the pointed end for increasing the resiliency of the present invention. The upper clasp and the lower clasp removably engage a rim along the review mirror securing the present invention to the rearview mirror.

4 Claims, 2 Drawing Sheets

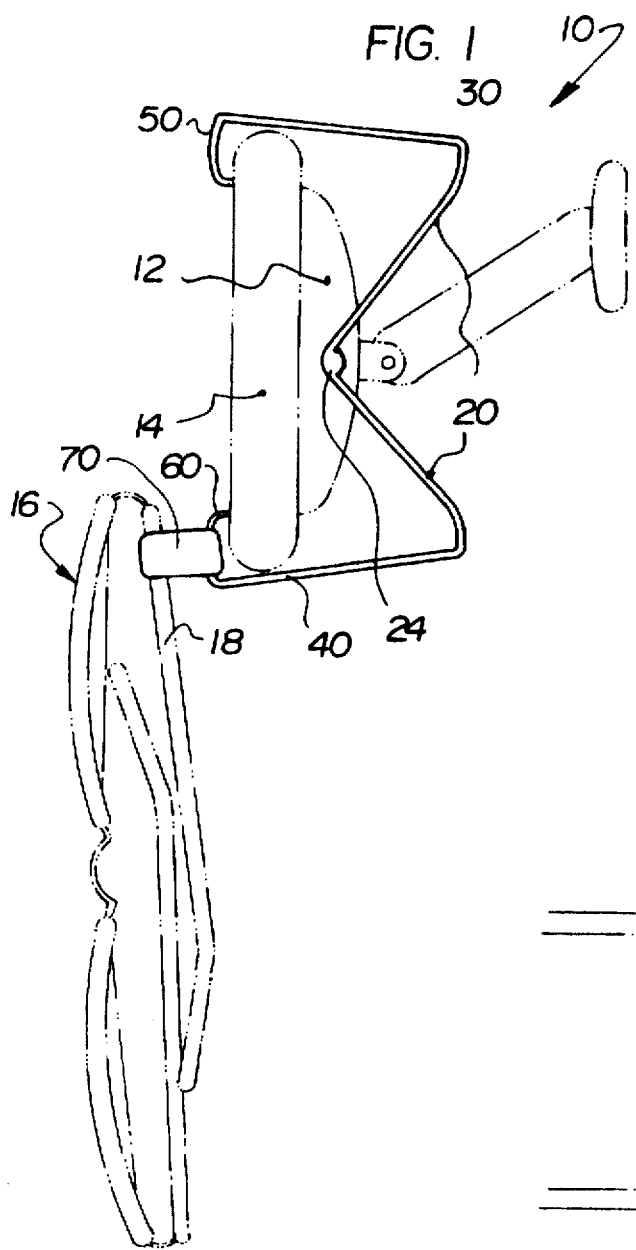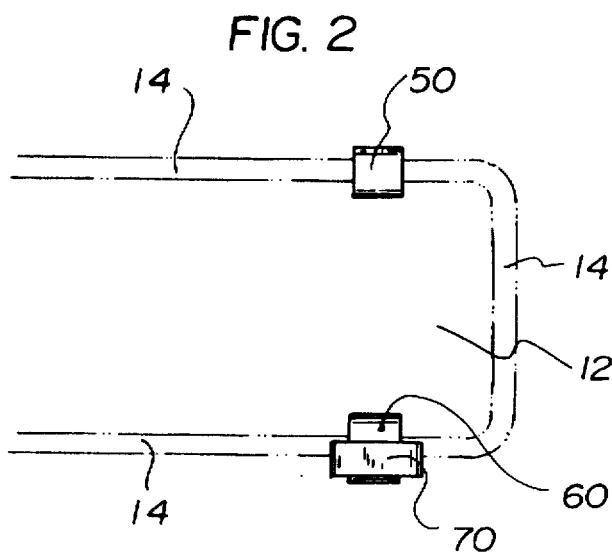

EYEGLASS HOLDER MOUNTED ON A REARVIEW MIRROR

BACKGROUND OF THE INVENTION

1. Field of the Invention

The present invention relates to Eyeglass Receptacle Devices and more particularly pertains to a new Eyeglass Holder Mounted On A Rearview Mirror for providing a safe and convenient place for the storage of eyeglasses within a vehicle thereby preventing the eyeglasses from becoming scratched or broken.

2. Description of the Prior Art

The use of Eyeglass Receptacle Devices is known in the prior art. More specifically, Eyeglass Receptacle Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Eyeglass Receptacle Devices include U.S. Pat. No. 4,867,402; U.S. Design Pat. No. 327,285; U.S. Design Pat. No. 313,501; U.S. Pat. No. 4,157,166; U.S. Pat. No. 5,000,410 and U.S. Pat. No. 5,372,345.

While these devices fulfill their respective, particular objectives and requirements, the aforementioned patents do not disclose a new Eyeglass Holder Mounted On A Rearview Mirror. The inventive device includes a resilient syncline member, an upper arm secured to the syncline member, a lower arm secured to the syncline member opposite of the upper arm forming an M-shape, an upper clasp secured to the upper arm and a lower clasp secured to the lower arm.

In these respects the Eyeglass Holder Mounted On A Rearview Mirror according to the present invention substantially departs from the conventional concepts and designs of the prior art, and in so doing provides an apparatus primarily developed for the purpose of providing a safe and convenient place for the storage of eyeglasses within a vehicle thereby preventing the eyeglasses from becoming scratched or broken.

SUMMARY OF THE INVENTION

In view of the foregoing disadvantages inherent in the known types of Eyeglass Receptacle Devices now present in the prior art, the present invention provides a new Eyeglass Holder Mounted On A Rearview Mirror construction wherein the same can be utilized for providing a safe and convenient place for the storage of eyeglasses within a vehicle thereby preventing the eyeglasses from becoming scratched or broken.

The general purpose of the present invention, which will be described subsequently in greater detail, is to provide a new Eyeglass Holder Mounted On A Rearview Mirror apparatus and method which has many of the advantages of the Eyeglass Receptacle Devices mentioned heretofore and many novel features that result in a new Eyeglass Holder Mounted On A Rear-view Mirror which is not anticipated, rendered obvious, suggested, or even implied by any of the prior art Eyeglass Receptacle Devices, either alone or in any combination thereof To attain this, the present invention generally comprises a resilient syncline member, an upper arm secured to the syncline member, a lower arm secured to the syncline member opposite of the upper arm forming an M-shape an upper clasp secured to the upper arm and a lower clasp secured to the lower arm.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Eyeglass Holder Mounted On A Rearview Mirror apparatus and method which has many of the advantages of the Eyeglass Receptacle Devices mentioned heretofore and many novel features that result in a new Eyeglass Holder Mounted On A Rearview Mirror which is not anticipated, rendered obvious, suggested, or even implied by any of the prior art Eyeglass Receptacle Devices, either alone or in any combination thereof.

It is another object of the present invention to provide a new Eyeglass Holder Mounted On A Rearview Mirror which may be easily and efficiently manufactured and marketed.

It is a further object of the present invention to provide a new Eyeglass Holder Mounted On A Rearview Mirror which is of a durable and reliable construction.

An even further object of the present invention is to provide a new Eyeglass Holder Mounted On A Rearview Mirror which is susceptible of a low cost of manufacture with regard to both materials and labor, and which accordingly is then susceptible of low prices of sale to the consuming public, thereby making such Eyeglass Holder Mounted On A Rearview Mirror economically available to the buying public.

Still yet another object of the present invention is to provide a new Eyeglass Holder Mounted On A Rearview Mirror which provides in the apparatuses and methods of the prior art some of the advantages thereof, while simultaneously overcoming some of the disadvantages normally associated therewith.

Still another object of the present invention is to provide a new Eyeglass Holder Mounted On A Rearview Mirror for providing a safe and convenient place for the storage of eyeglasses within a vehicle thereby preventing the eyeglasses from becoming scratched or broken.

Yet another object of the present invention is to provide a new Eyeglass Holder Mounted On A Rearview Mirror which includes a resilient syncline member an upper arm secured to the syncline member, a lower arm secured to the syncline member opposite of the upper arm forming an M-shape, an upper clasp secured to the upper arm and a lower clasp secured to the lower arm.

Still yet another object of the present invention is to provide a new Eyeglass Holder Mounted On A Rearview Mirror that does not obstruct the view of a driver through the rearview mirror or windshield.

Even still another object of the present invention is to provide a new Eyeglass Holder Mounted On A Rearview Mirror that secures to various sizes of rearview mirrors.

Another object of the present invention is to provide a new Eyeglass Holder Mounted On A Rearview Mirror that does not require any adhesives or suction devices.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof Such description makes reference to the annexed drawings wherein:

FIG. 1 is an side view of a new Eyeglass Holder Mounted On A Rearview Mirror secured to a rearview mirror according to the present invention.

FIG. 2 is a front view of the present invention secured to the rear view mirror.

DESCRIPTION OF THE PREFERRED EMBODIMENT

Figure 3:
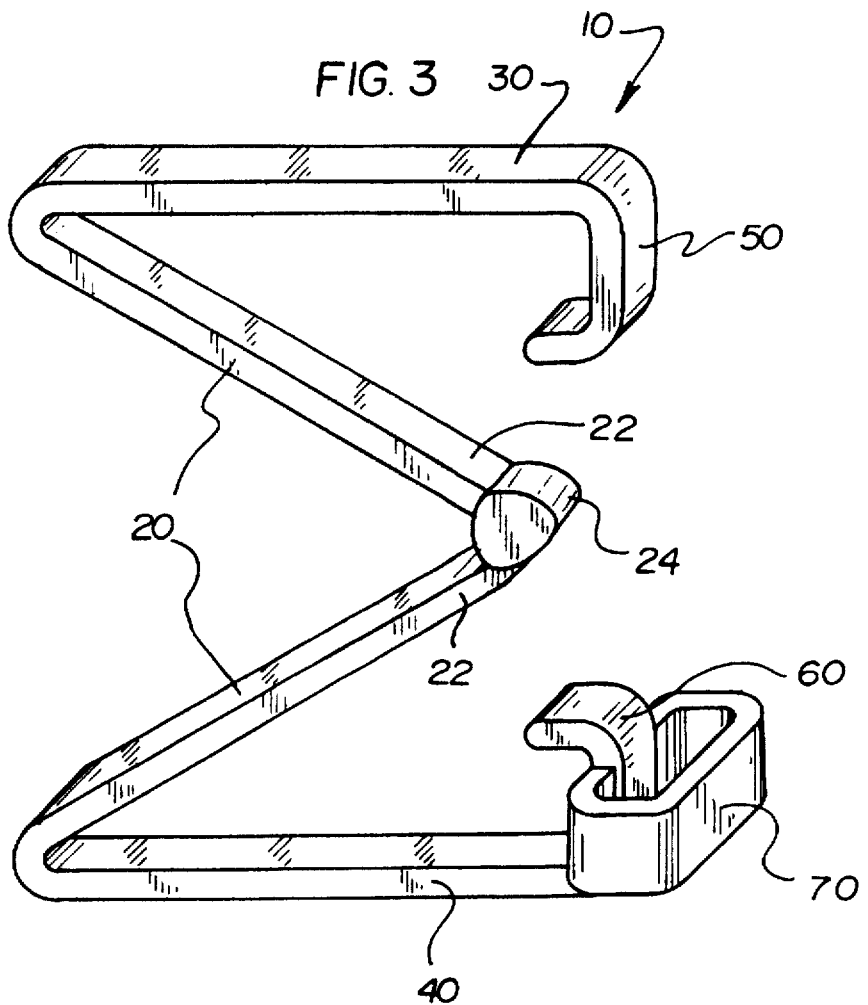
FIG. 3 is an upper perspective view of the present invention.

With reference now to the drawings, and in particular to FIGS. 1 through 4 thereof, a new Eyeglass Holder Mounted On A Rearview Mirror embodying the principles and concepts of the present invention and generally designated by the reference numeral 10 will be described.

As shown in FIGS. 1 through 4 of the drawings, the present invention comprises a resilient syncline member 20 having a pointed end 22. The pointed end 22 removably engages a rear surface of a rearview mirror 12 as best shown in FIG. 1 of the drawings. An upper arm 30 is secured to an end of the syncline member 20 opposite of the pointed end 22. A lower arm 40 is secured to an end of the syncline member 20 opposite of the upper arm 30 forming an M-shaped structure as best shown in FIG. 3 of the drawings. The lower arm 40 is substantially parallel to the upper arm 30 as shown in FIG. 1.

Figure 4:
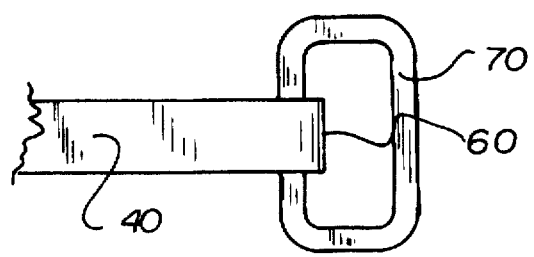
FIG. 4 is a magnified cut away view of the loop secured to the lower clasp.

As shown in FIGS. 1 through 3 of the drawings, an upper clasp 50 is secured to the upper arm 30 opposite of the syncline member 20 for removably engaging a rim 14 of various sizes of the rearview mirror 12. The upper clasp 50 projects substantially towards the pointed end 22 as shown in FIG. 3. A lower clasp 60 is secured to the lower arm 40 opposite of the syncline member 20 for removably engaging the rim 14 of various sizes of the rearview mirror 12 opposite of the upper clasp 50. The lower clasp 60 projects substantially towards the pointed end 22 as best shown in FIG. 3. As best shown in FIGS. 3 and 4, a loop 70 is secured to the lower clasp 60 for receiving a temple arm 18 from a pair of eyeglasses 16. An axis of the loop 70 is preferably substantially orthogonal to a longitudinal axis of the lower arm 40 and the loop 70 projects away from the lower arm 40. A cylindrical member 24 is preferably secured to the pointed end 22 orthogonal to a plane formed by the syncline member 20 as shown in FIG. 1 and 3 of the drawings. The syncline member 20 is preferably constructed from a lightweight, resilient plastic thereby reducing damage to the rearview mirror 12 and eyeglasses 16.

In use, the user secures the present invention to a rearview mirror 12 by securing the upper clasp 50 around the rim 14 of the rearview mirror 12. The cylindrical member 2-4 is juxtaposed to the rear surface of the rearview mirror 12 and the lower clasp 60 is secured around the rim 14 opposite of the upper clasp 50. This forces the cylindrical member 24 against the rear surface of the rearview mirror 12 thereby creating constant tension toward the upper clasp 50 and the lower clasp 60 to retain the clasps 50, 60 onto the rim 14. The user thereafter inserts the temple arm 18 of the eyeglasses 16 through the loop 70 where the eyeglasses 16 are conveniently stored during non-use, thereby preventing scratching or breakage of the eyeglasses 16.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An eyeglass holder mounted on a rearview mirror comprising:

a resilient syncline member having a pointed end for removably engaging a rear surface of said rearview mirror when said syncline member is mounted to said rearview mirror;

an upper arm secured to an end of said syncline member opposite of said pointed end;

a lower arm secured to an end of said syncline member opposite of said upper arm forming an M-shaped structure, where said lower arm is substantially parallel to said upper arm;

an upper clasp secured to said upper arm opposite of said syncline member for removably engaging a rim of various sizes of said rearview mirror, where said upper clasp projects substantially towards said pointed end;

a lower clasp secured to said lower arm opposite of said syncline member for removably engaging said rim of various sizes of said rearview mirror, where said lower clasp projects substantially towards said pointed end; and a loop secured to said lower clasp for receiving a temple arm from a pair of eyeglasses, wherein an axis of said loop is substantially orthogonal to a longitudinal axis of said lower arm and said loop projects away from said lower arm.

2. The eyeglass holder mounted on a rearview mirror of claim 1, wherein a generally cylindrical member is secured to said pointed end and the axis of said cylindrical member is orthogonal to a plane formed by said syncline member.

3. The eyeglass holder mounted on a rearview mirror of claim 2, wherein said syncline member is constructed from a resilient plastic.

4. An eyeglass holder for mounting on a rearview mirror, the eyeglass holder comprising:

a resilient plastic V-shaped tension member having a pointed end, said pointed end being adapted to contact a rear surface of the rearview mirror when the tension member is mounted on the rearview mirror;

an upper arm secured to an end of said tension member opposite of said pointed end;

a lower arm secured to an end of said tension member opposite of said upper arm such that said lower arm is substantially parallel to said upper arm;

an upper clasp secured to said upper arm opposite of said tension member, said upper clasp being for removably engaging a rim of said rearview mirror, where said upper clasp projects substantially towards said pointed end;

a lower clasp secured to said lower arm opposite of said tension member, said lower clasp being for removably engaging said rim of said rearview mirror, where said lower clasp projects substantially towards said pointed end;

a loop coupled to said lower clasp, said loop being adapted for receiving a temple arm from a pair of eyeglasses, wherein a longitudinal axis of said loop is substantially orthogonal to a longitudinal axis of said lower arm such that said loop projects away from said lower arm: and wherein a generally cylindrical member is secured to said pointed end and a longitudinal axis of said cylindrical member is orthogonal to a plane formed by said tension member said cylindrical member adapted to be forced against the rear surface of the rearview mirror for creating constant tension toward said upper and lower clasps.

* * * * *